US009009536B2

(12) United States Patent  
Dancy et al.

(10) Patent No.: US 9,009,536 B2  
(45) Date of Patent: Apr. 14, 2015

(54) TEST CASE PRODUCTION UTILIZING PROBLEM REPORTS

(71) Applicant: International Business Machines Corporation, Armonk, NY (US)

(72) Inventors: Jerry A. Dancy, Raleigh, NC (US); John Hind, Raleigh, NC (US); Geoffrey D. Lubold, Wake Forest, NC (US); Brad B. Topol, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 13/633,466

(22) Filed: Oct. 2, 2012

(65) Prior Publication Data

US 2014/0095934 A1    Apr. 3, 2014

(51) Int. Cl.  
*G06F 11/00* (2006.01)  
*G06F 11/36* (2006.01)

(52) U.S. Cl.  
CPC .................. *G06F 11/3684* (2013.01)

(58) Field of Classification Search  
CPC ............ G06F 11/3688; G06F 11/3684; G06F 11/3664; G06F 11/3672  
USPC ................. 714/38.1, 47.1; 717/124  
See application file for complete search history.

(56) References Cited

U.S. PATENT DOCUMENTS

| | | | |
|---|---|---|---|
| 5,831,998 A | 11/1998 | Ozmizrak | |
| 6,002,869 A | 12/1999 | Hinckley | |
| 7,299,382 B2 | 11/2007 | Jorapur | |
| 7,337,427 B2* | 2/2008 | Carrigan | 717/100 |
| 8,161,458 B2* | 4/2012 | Johnson et al. | 717/124 |
| 2004/0205406 A1 | 10/2004 | Kaliappan et al. | |
| 2008/0126880 A1 | 5/2008 | Hegarty et al. | |
| 2013/0346163 A1* | 12/2013 | Kemmer et al. | 705/7.41 |
| 2014/0095934 A1* | 4/2014 | Dancy et al. | 714/32 |

OTHER PUBLICATIONS

IBM "Automated creation of Test Cases from reported Problems & Creation of Test Cases for the new Product from Predicted Problems", IPCOM000131992D, Nov. 28, 2005.

\* cited by examiner

*Primary Examiner* — Philip Guyton  
(74) *Attorney, Agent, or Firm* — Russell Ng PLLC; Tom Tyson

(57) ABSTRACT

Accessing a problem report data store including customer problem reports. Each customer problem report includes configuration and platform data. Calculating a number of instances each platform is stored, and identifying platforms that satisfy a platform threshold. Calculating a number of instances each configuration is stored, and identifying configurations that satisfy a configuration threshold. Calculating a number of instances each platform is associated with each configuration, and generating a data structure with a plurality of nodes and edges. Each of the nodes identifies one of the platforms and configurations. The weight of the edge connecting a platform to a configuration indicates a number of instances that the platform is associated with the configuration in the data store. Identifying a weighted edge that satisfies a weight threshold, where the weighted edge connects a first platform to a first configuration and, in response, generating a test case for development of a software product.

18 Claims, 5 Drawing Sheets

TEST CASE PRODUCTION UTILIZING PROBLEM REPORTS

BACKGROUND

1. Technical Field

The present invention generally relates to data processing, and more particularly, to test case production.

2. Description of the Related Art

The process of software development requires numerous phases. One of these phases is testing. A software product may be tested before it is released to identify and address potential errors in the product. For example, a test case may be computer code which verifies a specific path which the software product in development should follow during execution. Testing a software product prior to release may prevent a developer from having to spend significant time and resources to address errors after a software product has been deployed to many customers.

BRIEF SUMMARY

Aspects of the described embodiments provide a method, a system, and a computer program product for test case generation. The method includes accessing a problem report data store including customer problem reports collected automatically. Each of the customer problem reports includes configuration data and platform data of a system that executes the first version of the software product. The method also includes calculating a number of instances each platform is stored in the decision support database, and identifying a set of platforms for which the corresponding number of instances satisfies a predefined platform threshold. The method also includes calculating a number of instances each configuration is stored in the decision support database, and identifying a set of configurations for which the corresponding number of instances satisfies a predefined configuration threshold. The method also includes calculating a number of instances each platform of the set of platforms is associated with each configuration of the set of configurations, and generating a mapping data structure comprising a plurality of nodes and edges. Each of the nodes of the mapping data structure identifies one of the set of platforms and the set of configurations. The weight of the edge connecting a particular platform to a particular configuration indicates a number of instances that the particular platform is associated with the particular configuration in the problem report data store. The method also includes identifying a weighted edge of a weight that satisfies a predefined weight threshold, where the weighted edge connects a first platform to a first configuration and, in response, automatically generating a test case for development of a second version of the software product. The test case is configured to test execution of the second version of the software product on the first platform.

With the system implementation, the system includes a processor, a memory, and computer readable code that performs the various processes of the method by executing code on the processor. Finally, the computer program product implementation comprises a computer readable storage medium that includes computer readable code which, when executed by a processor, is configured to perform the method processes.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments is to be read in conjunction with the accompanying drawings, wherein.

DETAILED DESCRIPTION

Figure 1:
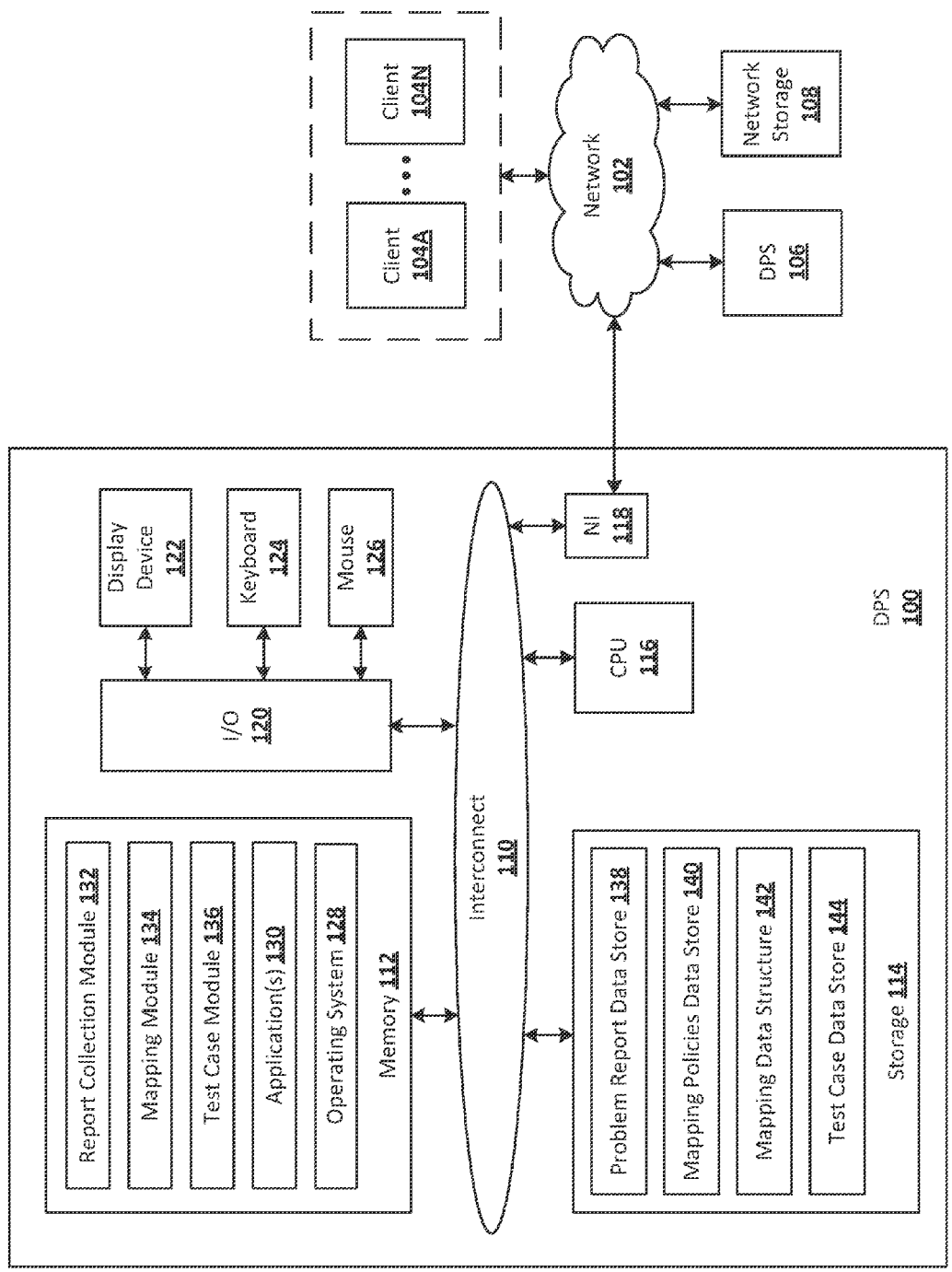
FIG. 1 provides a block diagram representation of an illustrative network of data processing systems within which the invention can be practiced, according to one embodiment.

The illustrative embodiments provide a method, system and computer program product for generating test cases for software developers. Briefly, a data processing system receives customer problem reports from customers executing a first version of a computer program on client devices. The data processing system generates a data structure that maps platforms identified in the problem reports to configurations identified in the problem reports. A test case module identifies the most common associations between specific platforms and specific configurations, and generates test cases for developers developing the second version of the computer program using the specific platforms and specific configurations.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions (or code). These computer program instructions may be provided to a processor of a general purpose computer, special purpose computer, or other programmable data processing apparatus to produce a machine, such that the instructions, which execute via the processor of the computer or other programmable data processing apparatus, implement the methods/processes/functions/acts specified in the one or more blocks of the flowchart(s) and/or block diagram(s).

These computer program instructions may also be stored in a computer readable medium that can direct a computer, other programmable data processing apparatus, or other devices to function in a particular manner, such that the instructions stored in the computer readable medium produce an article of manufacture (or computer program product) including instructions which implement the method/process/function/act specified in the one or more blocks of the flowchart(s) and/or block diagram(s). The computer program instructions may also be loaded onto a computer, other programmable data processing apparatus, or other devices to cause a series of operational steps to be performed on the computer, other programmable apparatus or other devices to produce a computer implemented process/method, such that the instructions which execute on the computer or other programmable apparatus implement the method/process/functions/acts specified in one or more blocks of the flowchart(s) and/or block diagram(s).

It is understood that the use of specific component, device and/or parameter names (such as those of the executing utility/logic described herein) are for example only and not meant to imply any limitations on the invention. The invention may thus be implemented with different nomenclature/terminology utilized to describe the components, devices, or parameters herein, without limitation. Each term utilized herein is to be given its broadest interpretation given the context in which that terms is utilized.

With reference now to the figures, and beginning with FIG. 1, there is depicted a block diagram representation of an illustrative data processing system (DPS) 100, which may be connected to various customer client devices 104A-104N, a second DPS 106, as well as various network storage devices, such as network storage 108, across a network 102. In one or more embodiments, any one of client device 104A-104N, DPS 106, and network storage 108 may additionally, or alternatively, include one or more of the modules or devices depicted in DPS 100 described below.

DPS 100 includes numerous components logically connected by an interconnect 110. Specifically, FIG. 1 depicts DPS 100 including a memory 112, a storage 114, an input/output (I/O) controller 120, central processing unit (CPU) 116 (also interchangeably referred to as a processor or computer processor), and network interface (NI) 118. Those skilled in the art will appreciate that CPU 116 can be any kind of hardware processor. I/O controller 120 allows a user to interface with DPS 100 via one or more I/O devices, such as display device 122, keyboard 124, and mouse 126.

Storage 114 may be any kind of computer storage device, volatile or non-volatile, such as a hard disk, an optical drive such as a compact disk drive or digital video disk (DVD) drive, and a flash memory drive. In one or more embodiments, storage 114 may include one or more of problem report data store 138, mapping policies data store 140, mapping data structure 142, and test case data store 144. However, in one or more embodiments, any or all of the components illustrated within storage 144 may be stored in storage within DPS 106, and/or within, or distributed across, network storage 108.

In one or more embodiments, problem report data store 138 includes data from customer problem reports. In one or more embodiments, the customer problem reports are received by DPS 100 from various client devices (e.g. Clients 104A-104N). Customer problem reports may be collected in response to an error occurring in the client devices 104A-104N during execution, or because of execution, of a first version of a software product. In one or more embodiments, each customer problem report may be stored as a record in the data store, and include information such as identifying information for the user of the client device from which the problem report is received, as well as environment information about the client device, such as a platform on which the software product executes, and other configuration information for the client device. In one or more embodiments, configuration information may include several types of data. For example, configuration information may include databases or application protocols associated with the client device submitting the problem report or used in conjunction with the software product, or data indicating whether the client device is a standalone device or a clustered device. In one or more embodiments, problem report data store 138 may also include other information related to the error that triggered the problem report. For example, the problem report data store may also include a time of day the error occurred, type of user input prior to the error, or other types of data that may be associated with the error triggering the creation of the problem report.

In one or more embodiments, mapping policies data store 140 includes data used to create a data structure illustrating associations among relevant data in the problem reports stored in the problem report data store. In one or more embodiments, mapping policies data store 140 includes a count for a number of instances that each type of data occurs in the problem report data store 138. This may include, for example, a count of the number of instances each platform is stored, or a number of instances each configuration is stored as part of a record in the problem report data store 138. More specifically, mapping policies data store 140 may include a count for a number of instances that each database appears in the data store, a count for a number of instances each application protocol appears in the data store. Further, in one or more embodiments, mapping policies data store 140 includes a count of a number of instances that a problem report is received from a standalone device, and a number of instances that a problem report is received from a clustered device.

Mapping policies data store 140 may include other data used to generate mapping data structure 142. In one or more embodiments, mapping data structure 142 is a mapping including nodes and edges, wherein the weight of each edge indicates a relative number of occurrences that the nodes connected by the edges are associated in problem report data store 138. Mapping policies data store 140 may include values for parameters used to determine what data should appear in the mapping data structure 142 and how that data affects the mapping data structure 142. For example, mapping policies data store 140 may include a platform threshold and a configuration threshold. When a number of instances that a particular platform or configuration satisfies the platform threshold or configuration threshold, then the specific platform or configuration is considered to be relevant and will be depicted as a node in mapping data structure 142. Mapping policies data store 140 may also include a count of a number of times each platform that satisfies the platform is associated with each configuration that satisfies the configuration threshold.

Further, in one or more embodiments, mapping policies data store 140 may include data that determines the granularity of the weighted edges. In one or more embodiments, mapping policies data store 140 includes a weight threshold. When the weight of the edge connecting two particular nodes is satisfied, then DPS 100 generates a test case for the platform and/or configuration identified in the two connected nodes for testing a second version of the computer program. Test case data store 140 includes test cases that are generated for use in development of a second version of the software product associated with the problem reports stored in the problem report data store 138.

Memory 112 may be random access memory (RAM), cache memory, flash memory, or any other kind of storage structure or storage device that is configured to store computer instructions/code executable by CPU 116 and/or to store data utilized during such execution. As depicted, memory 112 includes operating system 128. Operating system 128 may be any platform that manages the execution of computer code and manages hardware resources. For example, operating system 128 may be the Advanced Interactive Executive (AIX®) operating system, the LINUX® operating system, or any other operating system known in the art. AIX® is a registered trademark of International Business Machines Corporation, and LINUX® is a registered trademark of Linus Torvalds.

Memory 112 also includes one or more applications 130 and a plurality of functional modules, such as report collection module 132, mapping module 134, and test case module 136. For purposes of clarity of this description, applications 130, as well as report collection module 132, mapping module 134 and test case module 136, are computer programs or applications embodied in memory 112 as executable computer code which can be executed by CPU 116 and which can manage generation of test cases.

In one or more embodiments report collection module 132 includes computer code which, when executed by CPU 116, collects customer problem reports from customers executing a first version of a software product on client devices 104A-104N. The problem reports are collected and stored in problem report data store 138 in storage 114. As described above, the problem reports collected by report collection module 132 include various identifying data for a customer and/or customer device executing the first version of the software product, and environmental data associated with an error caused by execution of the first version of the software product. In one or more embodiments, report collection module 132 may generate a report to send to a user on client devices 104A-104N on request to complete and sent back to DPS 100. In one or more embodiment, problem reports 104A-104N may be generated at client 104A-104N and report collection module 132 may analyze the report submitted and parse the report such that the customer problem reports stored in problem report data store 138 are stored in a consistent manner.

In one or more embodiments, mapping module 134 includes computer code which, when executed by CPU 116, retrieves problem report data from problem report data store 138, accesses mapping policies stored in mapping policies data store 144, and applies the mapping policies to the problem report data to generate a mapping data structure. In one or more embodiments, mapping module 134 generates the mapping data structure having nodes representing platforms and configurations, and edges connecting the nodes, where the edges are of varying weights indicating the relative number of associations between two nodes. For example, an edge with a heavier weight indicates that the two connected nodes are associated with each other more times than two nodes connected by an edge with a lighter weight. Mapping module 134 stores the generated mapping data structure in mapping data structure 142. In one or more embodiments, after mapping module 134 generates mapping data structure 142, then mapping module 134 may modify mapping data structure 142 in response to the report collection module 132 receiving new customer problem reports, or in response to determining that the mapping policies stored in mapping policies data store 144 are modified. In one or more embodiments, mapping policies may be modified by a user using DPS 100, or may be modified automatically based on test case production. For example, if DPS 100 is generating too many test cases based on some metric that may be stored in mapping policies data store 144, then mapping module 134 may increase or decrease the metric to cause a decrease in the number of test cases produced. In another embodiment, mapping module 134 may display the various thresholds and policies to a user, and may display a prompt for a user to modify any policy or threshold stored in mapping policies data store 144. In one or more embodiments, mapping module 134 may display the modified mapping data structure 142 on a display device.

Test case module 136 includes computer code which, when executed by CPU 116, retrieves mapping data structure 142, accesses mapping data structure 142, identifies edges in mapping data structure 142 of a particular weight, and generates test cases that are configured to test execution for the second version of the software product using the platform and/or configurations identified by each set of nodes connected by the identified edges. In one or more embodiments, test case module 136 may access mapping policies data store 140 to determine a weight threshold used to identify particular edges. The generated test cases may be stored in test case data store 144, and/or transmitted across network 102 to software developers for use in development of the second version of the software product. In one or more embodiments, test case module 136 may request certain parameters or development data from a software developer and may generate the test cases to be configured to those parameters.

Those of ordinary skill in the art will appreciate that the hardware components and basic configuration depicted in FIG. 1 may vary. The illustrative components within DPS 100 are not intended to be exhaustive, but rather are representative to highlight components that can be utilized to implement the present invention. For example, other devices/components may be used in addition to or in place of the hardware depicted. The depicted example is not meant to imply architectural or other limitations with respect to the presently described embodiments and/or the general invention. The data processing system depicted in FIG. 1 may be, for example, IBM Power Systems, a product of International Business Machines Corporation in Armonk, N.Y., running the Advanced Interactive Executive (AIX) operating system or LINUX operating system.

Figure 2:
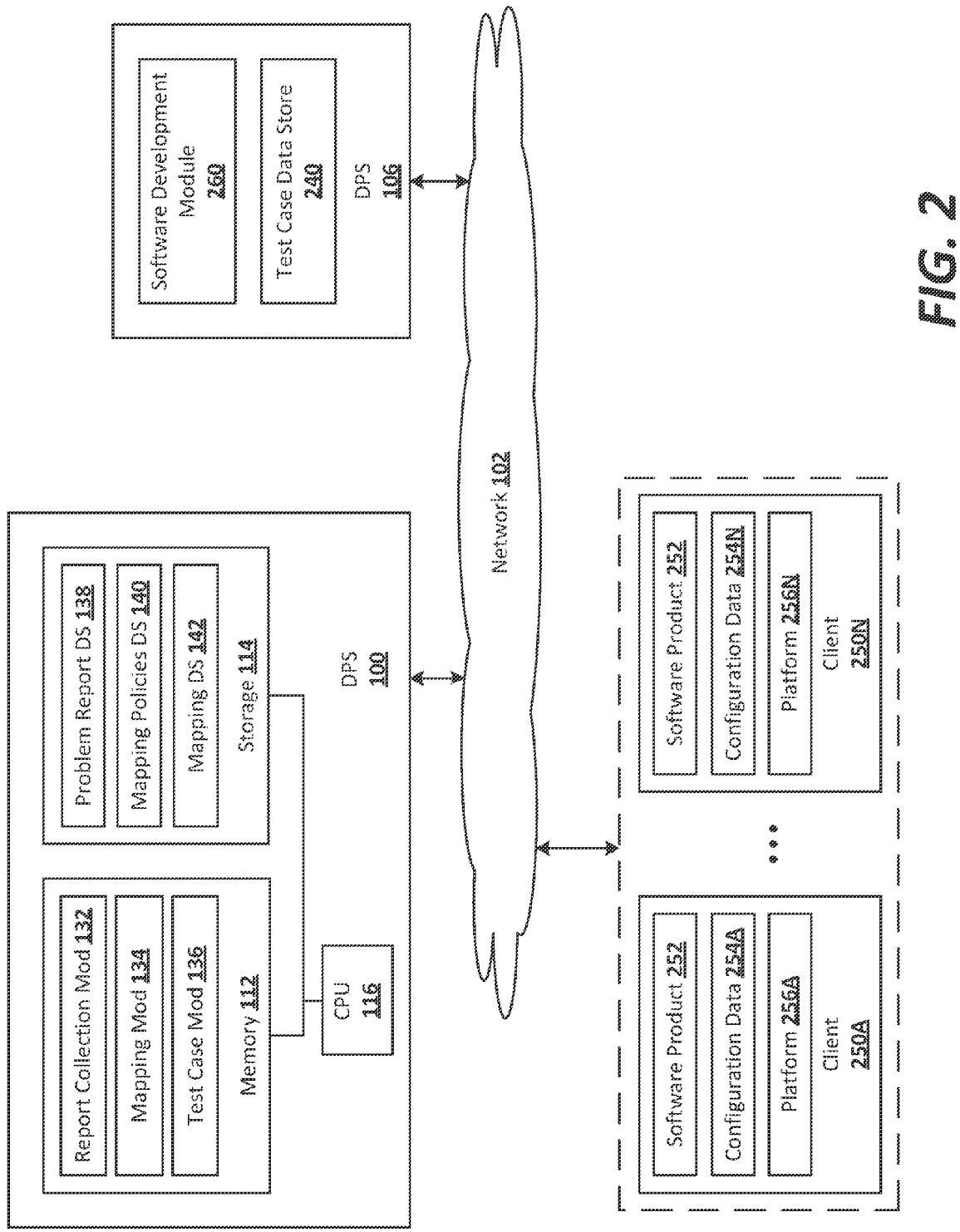
FIG. 2 provides a detailed block diagram representation of an illustrative network of data processing systems within which the invention can be practiced, according to one embodiment.

FIG. 2 illustrates an alternative block diagram representation of an illustrative data processing system (DPS) 100, connected to various customer client devices 250A-250N, and a second DPS 106, across a network 102. Some components illustrated in FIG. 2 are illustrated in the same configuration as in FIG. 1. Specifically, DPS 100 includes memory 112, storage 114, and CPU 116. Memory 112 includes report collecting module 132, mapping module 134, and test case module 136. Storage 114 includes problem report data store 138, mapping policies data store 138, and mapping data structure 142.

DPS 100 is depicted as being connected across network 102 to DPS 106 and client devices 250A-250N. For purposes of the illustrative embodiment depicted in FIG. 2, clients 250A-250N each include an instance of the first version of the software product 252. Clients 250A-250N also each include a platform 256A-256N, and configuration data 254A-254N, respectively. In one or more embodiments, each of platforms 256A-256N may be, for example Advanced Interactive Executive (AIX®) operating system, the LINUX® operating system, or any other operating system known in the art. As described above, client devices 250A-250N may submit customer problem reports to DPS 100 by generating a problem report that includes the configuration data and platform data, as well as data identifying whether the sending device is a standalone device or a clustered device, among other data identifying the sending device and/or the execution environment. The collected data may be stored, for example, in problem report data store 138 in DPS 100.

DPS 106 represents a data processing system utilized for software development. In one or more embodiments, DPS 106 may be utilized to develop the second version of the software program. Although FIG. 2 depicts DPS 106 as a single device, in one or more embodiments software development may occur over numerous data processing systems. DPS 106, as depicted, includes test case data store 240, and software development module 260. In one or more embodiments, test case data store 240 is located in a storage device within DPS 106 and stores test cases generated by test case module 136 in DPS 100. Software development module 260 may include computer code which, when executed by a processor in DPS 106, allows a user to develop a software product. Software development module 260 may utilize test cases stored in test case data store 240 to test a version of a software product to identify and address errors during execution of the software product.

Figure 3:
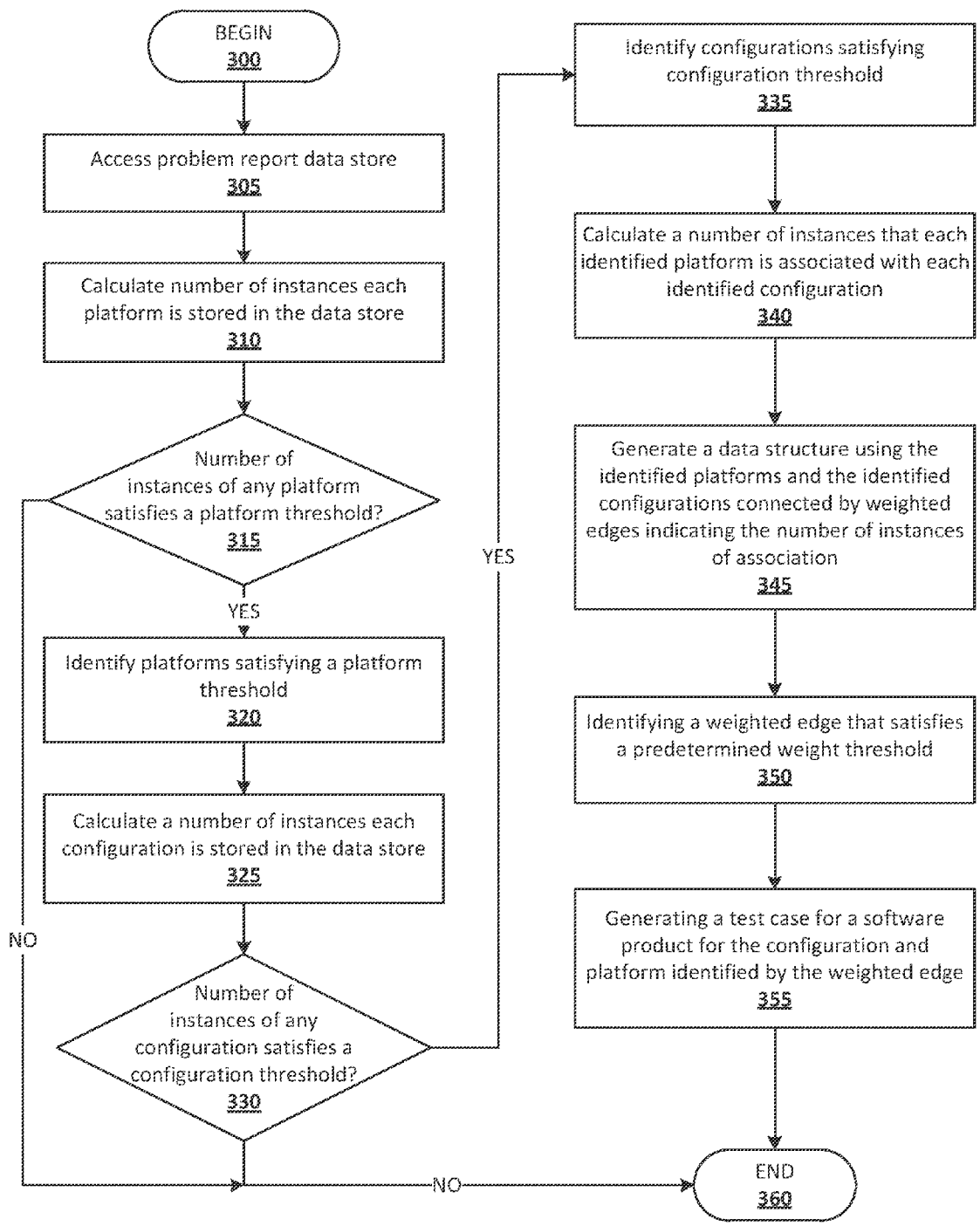
FIG. 3 is a flow chart illustrating a method for generating a test case, according to one embodiment.

FIG. 3 is a flow chart illustrating a method for test case generation, according to one embodiment. Specifically, FIG. 3 illustrates a method, implemented by the various modules in memory 112 (which provide executable code executable by a processor), to collect and analyze customer problem reports, create a mapping data structure based on the customer problem reports, and generate test cases based on the mapping data structure. In the following flowcharts, reference will be made to modules and devices as configured in FIG. 2 for clarity, although the modules and devices may be configured as in FIG. 1, or in any other configuration as described above.

The method begins at block 300. At block 305, report collection module 132 collects customer problem reports from client devices 250A-250N in response to an error occurring during execution of software product 252. Report collection module 132 may store the collected customer problem reports in problem report data store 138. At block 310, mapping module 134 calculates the number of instances each of platforms 256A-256N is stored in problem report data store 138. In one or more embodiments, mapping module 134 may access a count of the number of instances that each platform is stored. The count may be stored in mapping policies data store 140.

At decision block 315, mapping module 134 whether the number of instances that any platform is stored in the problem report data store 138 satisfies a predetermined platform threshold. Said another way, mapping module 134 determines whether any platform is associated with at least a certain number of records in the problem report data store 138. The platform threshold may be stored in mapping policies data store 140. If no platform is stored a number of instances that satisfies the platform threshold, then the method ends at block 360. Alternatively, the method could return to block 310, and the mapping module 134 may wait until at least one platform is stored in the problem report data store 138 enough times to satisfy the predetermined platform threshold.

If the number of instances of any platform satisfies the predetermined platform threshold, then the method continues at block 320. At block 320, the mapping module identifies the specific platforms that satisfy the platform threshold. Mapping module 134 determines that any platform that is stored a number of times that satisfies the predetermined platform threshold is relevant for the mapping data structure 142.

The method continues at block 325, and the mapping module 134 calculates the number of instances each configuration of configurations 254A-254N is stored in problem report data store 138. In one or more embodiments, mapping module 134 may access a count of the number of instances that each configuration is stored. The count may be stored in mapping policies data store 140. The method continues at decision block 330, and mapping module 134 determines whether the number of instances that any configuration is stored in the problem report data store 138 satisfies a predetermined configuration threshold. Said another way, mapping module 134 determines whether any configuration is associated with at least a certain number of records in the problem report data store 138. The configuration threshold may be stored in mapping policies data store 140. If no configuration is stored a number of instances that satisfies the platform threshold, then the method ends at block 360. Alternatively, the mapping module 134 may wait until at least one configuration is stored in the problem report data store 138 enough times to satisfy the predetermined configuration threshold.

If the number of instances of any configuration satisfies the predetermined configuration threshold, then the method continues at block 335. At block 335, the mapping module identifies the specific configurations that satisfy the configuration threshold. Mapping module 134 determines that any configuration that is stored a number of times that satisfies the predetermined configuration threshold is relevant for the mapping data structure 142.

The method continues at block 340. At block 340, the mapping module 134 calculates the number of instances that each platform identified at block 320 is associated with each configuration identified at block 335 within problem report data store 138. Said another way, if the problem report data store 138 contains a set of records each corresponding to an error occurring in client devices 250A-250N, mapping module 134 calculates the number of instances that a record identifies both a specific platform and a specific configuration.

The method continues at block 345, and the mapping module 134 generates a mapping data structure. The mapping data structure 142 includes nodes representing the platforms identified at block 320 and the configurations identified at block 335. The nodes are connected by weighted edges indicating the relative number of instances of associations between each set of connected nodes. In one or more embodiment, the policies for determining the granularity of the weighted edges are stored in mapping policies data store 140. Generating the weighted edges will be discussed in greater detail below with respect to FIG. 4.

At block 350, the test case module 136 identifies one or more weighted edge that satisfies a predetermined weight threshold. In another embodiment, the test case module 136 may additionally, or alternatively, identify the edge with the greatest weight. The test case module 136 may access the predetermined weight module from the mapping policy data store 140. The method continues at block 355, and the test case module 136 generates a test case for execution of a software product for execution on a device using the platform and configurations identified by the nodes connected by the weighted edge identified in block 350. Although not shown, the test case module 136 may store the generated test case in a local test case data store, or may transmit the generated test case to a software developer for storage in a remote test case data store 240, and/or for use by software development module 260. The method ends at block 360.

In the flow chart above, the method may be embodied in computer readable code stored in a computer readable storage medium such that the method is performed when the computer readable code is executed by a processor on a computing device. In some implementations, certain steps of the method are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Figure 4:
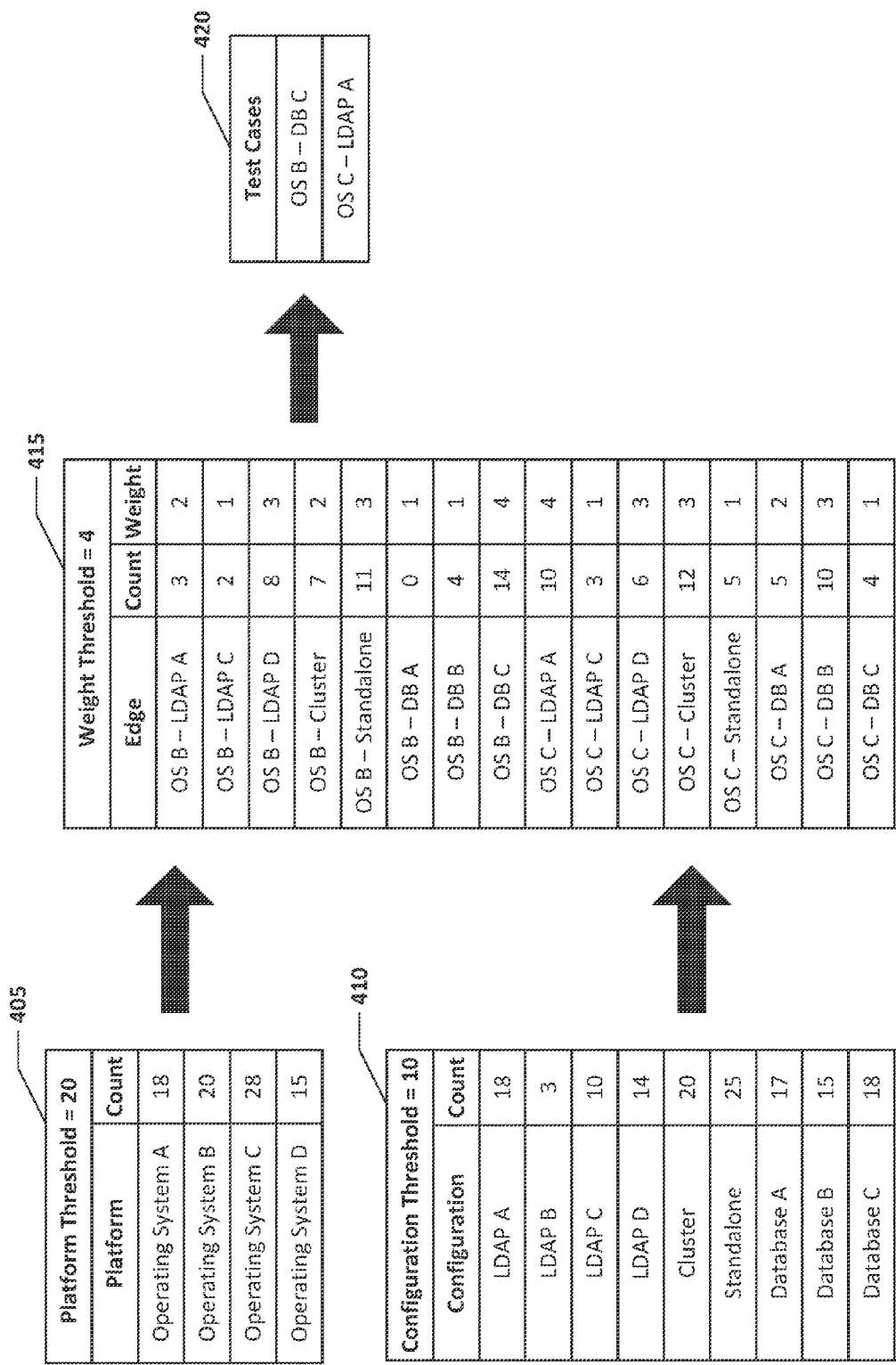
FIG. 4 depicts example data found within the problem report data store and test case data store, according to one embodiment.

FIG. 4 depicts example data found within problem report data store 138 and test case data store 240, according to one embodiment. Those skilled in the art will appreciate that the illustration depicted in FIG. 4 is intended only to provide an illustrative embodiment of the disclosure, and is not intended to limit the disclosure in any way.

FIG. 4 depicts four sets of data. This data may be stored, for example, in the problem report data store 138, mapping policies data store 140, the test case data store 240, or in any other storage device within DPS 100, DPS 106, or in network storage 108. Block 405 depicts platforms that appear in problem reports stored in problem report data store 138. In addition, Block 405 includes a predefined platform threshold. For purposes of this example, mapping module 134 has calculated a number of instances that each of Operating Systems A, B, C, and D are stored in the problem report data store 138. This calculation occurs, for example, at block 310 of FIG. 3. Operating systems A, B, C, and D have been stored in association with 18, 20, 28, and 15 problem reports, respectively. For purposes of this example, the platform threshold is 20. As described above, the threshold and/or the count that each operating system (i.e., platform) occurs may be stored in the mapping policies data store. Although a single platform threshold is depicted, in one or more embodiments, several platform thresholds may be utilized. For example, a little used operating system may have a lower threshold than a more widely used operating system. In another embodiment, DPS 100 may store inventory data for all customer devices on which the software product has been deployed and, thus, can determine the total number of each operating system on customer client devices. The threshold may indicate a specific percentage of client devices running a particular platform.

Block 410 depicts configurations that appear in problem reports stored in problem report data store 138. In addition, Block 410 includes a predefined configuration threshold. For purposes of this example, mapping module 134 has calculated a number of instances that each configuration is stored in the problem report data store 138. This calculation occurs, for example, at block 325 of FIG. 3. For purposes of this example, configurations include a set of application protocols (e.g., LDAP A, LDAP B, LDAP C), a set of databases (e.g., Database A, Database B, Database C, Database D, Database E), and an indication of whether the customer client device is a standalone device or a cluster device. Instances of LDAPs A, B, C, and D are stored 12, 3, 10, 14, and 20 times, respectively. Instances of databases A, B, C, D, and E are stored 17, 15, 18, 4, and 9 times respectively. As described above, the threshold and/or the count that each configuration occurs may be stored in the mapping policies data store 140. Although a single configuration threshold is depicted, in one or more embodiments, several configuration thresholds may be utilized. For example, mapping policies data store 140 may include a different threshold for each type of configuration. In one or more embodiments, mapping policies data store 140 may store inventory data for all customer devices on which the software product has been deployed and, thus, can determine the total number of each configurations are used on customer client devices. The threshold may indicate a specific percentage of client devices running a particular configuration.

Block 415 includes data regarding the number of instances that each identified platform is associated with each identified configuration, and depicts a weight assigned to each association. The identified platforms may be identified, for example, at block 320 of FIG. 3, and the identified configurations may be identified, for example, at block 335 of FIG. 3. For purposes of this example, based on the data shown in blocks 405 and 410, the mapping module 134 identifies Operating Systems B and C as platforms satisfying the platform threshold. Mapping module 134 also identifies LDAP A, C, D, Cluster, Standalone, Database A, B, and C as configurations satisfying the configuration threshold. Box 415 also includes a count of the number of instances that a particular association between an identified platform and an identified configuration occurs. For example, the mapping module 134 may calculate this count at block 340 of FIG. 3. In addition to a count, each association is assigned a weight. As depicted, the weight includes a weighted number indicating the relative occurrence of the association. For purposes of this example, an association that occurs many times is assigned a weight of 4, whereas an association that occurs only a few times relative to other associations is assigned a weight of 1. In one or more embodiments, the weights may be assigned based on the relative count among all associations, or the relative count among associations including a specific platform, or the relative count among associations including a specific configuration or type of configuration, or any combination thereof. In addition, the weight policies may be modifiable by a user, or may be modified automatically by mapping module 134 to increase or decrease granularity. For purposes of this example, the weights are assigned using a combination of the number of associations relative to associations including the particular type of configuration, and the number of associations relative to associations including a particular platform. Box 415 also includes a weight threshold. The weight threshold may be some value stored in the mapping policies data store 140. Test case module 136 identifies associations of a weight that satisfies the weight threshold. Test case module 136 may identify the associations, for example, at block 350 of FIG. 3. For purposes of this example, test case module identifies "OS B-DB C" and "OS C-LDAP A" as satisfying the weight threshold. Block 420 depicts test cases generated by test case module 136 based on the associations identified, for example, at block 350 of FIG. 3.

Figure 5:
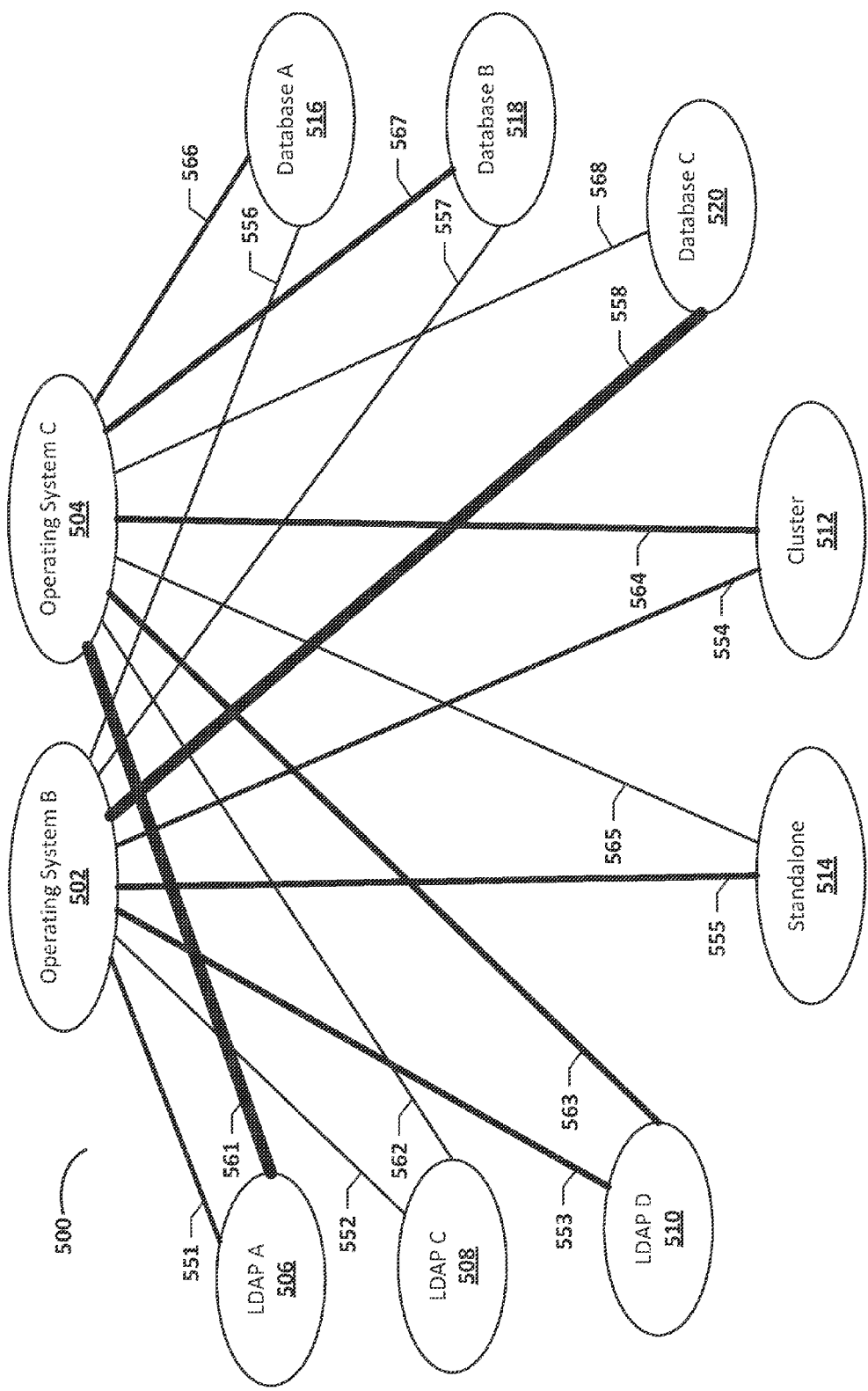
FIG. 5 depicts an example mapping data structure, according to one embodiment.

FIG. 5 depicts an example problem report data structure, according to one embodiment. For example, FIG. 5 depicts an example mapping data structure generated by mapping module 134 and stored as mapping data structure 142. Those skilled in the art will appreciate that the illustration depicted in FIG. 5 is intended only to provide an illustrative embodiment of the disclosure, and is not intended to limit the disclosure in any way.

FIG. 5 depicts a mapping data structure 500 including a set of nodes connected by edges. As described above, the nodes represent platforms and configurations for which the number of instances each platform or configuration is stored in the report collection module 132 satisfies a predetermined threshold. For purposes of this example, and based on the data in block 415 of FIG. 4, the nodes of mapping data structure 500 include nodes for platforms including Operating System B (OS B) 502, and Operating System C (OS C) 504. The nodes of mapping data structure 500 also include nodes for configurations including LDAP A 506, LDAP C 508, LDAP D 510, Standalone 514, Cluster 512, Database A (DB A) 516, Database B (DB B) 518, and Database C (DB C) 520.

Each of the nodes in mapping data structure 500 is associated with other nodes by weighted edges. Specifically, the node for OS B 502 and the node for OS C 504 are each connected to nodes identifying the various configurations identified above by various weighted edges. For purposes of this example, OS B 502 is connected to: LDAP A 506 by edge 551, LDAP C 508 by edge 552, LDAP D 510 by edge 553, Cluster 512 by edge 554, Standalone 514 by edge 555, DB A 516 by edge 556, DB B 518 by edge 557, and DB C 520 by edge 558. Additionally, OS C 504 is connected to: LDAP A 506 by edge 561, LDAP C 508 by edge 562, LDAP D 510 by edge 563, Cluster 512 by edge 564, Standalone 514 by edge 565, DB A 516 by edge 566, DB B 518 by edge 567, and DB C 520 by edge 568. In one or more embodiments, mapping module 134 may display mapping data structure 500 on a display device automatically or in response to a request received from a user for mapping data structure 500.

As shown, edges 551, 552, 553, 554, 555, 556, 557, 558, 561, 562, 563, 564, 565, 566, 567, and 568 are depicted at various weights. For purposes of this example, the weights of the edges correspond to the weights indicated in block 415 of FIG. 5. Thus, edges 552, 556, 557, 562, 565, and 568 are depicted with a weight of 1. In one or more embodiments, a weight of 1 indicates that the association between the two connected nodes does not occur often relative to other connections. Edges 551, 554 and 566 are depicted with a weight of 2, and edges 553, 555, 563, 564, and 567 are depicted with a weight of 3. Finally, edges 558 and 561 are depicted with a weight of 4.

As depicted in FIG. 4, the weight threshold for mapping data structure 500 is 4. Thus, test case module 136 determines that edges 558 and 561 satisfy the weight threshold. Accordingly, test case module 136 will generate two test cases. The first test case will test the software product on Operating System B using Database C. The second test case will test the software product on Operating System C using LDAP A.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code (or instructions) embodied thereon.

Any combination of one or more computer readable medium(s) may be utilized. The computer readable medium may be a computer readable signal medium or, alternatively, a computer readable storage medium. In some embodiments, aspects of the present invention may be embodied within a data replication module (e.g., FPGA or firmware) and implemented in firmware or logic. These embodiments can also be referred to as a "data replication module" or the like. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following storage devices: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible storage device that can store a program for use by or in connection with an instruction execution system, apparatus, or device.

Alternatively to a computer readable storage medium, a computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF signals, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for test case generation, the method comprising:
   accessing a problem report data store including a plurality of customer problem reports, wherein the plurality of customer problem reports are collected automatically, and wherein each of the plurality of customer problem reports comprises configuration data and platform data of a system that executes the first version of the software product;
   calculating a number of instances each platform is stored in the problem report data store;
   identifying a set of platforms for which the corresponding number of instances satisfies a predefined platform threshold;
   calculating a number of instances each configuration is stored in the problem report data store;
   identifying a set of configurations for which the corresponding number of instances satisfies a predefined configuration threshold;
   calculating a number of instances each platform of the set of platforms is associated with each configuration of the set of configurations;
   generating a mapping data structure comprising a plurality of nodes and edges,
      wherein each of the nodes of the mapping data structure identifies one of the set of platforms and the set of configurations,
      wherein the weight of the edge connecting a particular platform to a particular configuration indicates a number of instances that the particular platform is associated with the particular configuration in the problem report data store;
   identifying a weighted edge of a weight that satisfies a predefined weight threshold, wherein the weighted edge connects a first platform to a first configuration; and
   in response to identifying the weighted edge of a weight that satisfies the predefined weight threshold, automatically generating a test case for development of a second version of the software product, wherein the test case is configured to test execution of the second version of the software product on the first platform.

2. The method of claim 1, wherein the edges are weighted in relation to each other by associated platform.

3. The method of claim 2, further comprising, for each identified platform:
   identifying weighted edges for each platform greater than the weighted threshold; and
   generating a platform specific test case to execute on the platform and using the configurations associated with the platform by the identified weighted edges.

4. The method of claim 1, further comprising:
   displaying the data structure on a display device;
   displaying a prompt to modify the granularity of the weighted edges;
   in response to displaying the prompt to modify the granularity of the weighted edges, receiving a modified granularity of the weighted edges;
   generate a modified data structure using the modified granularity of the weighted edges; and
   generate a modified test case based on the modified data structure.

5. The method of claim 1, wherein the set of configurations includes at least one type selected from the group consisting of: a set of databases, a set of application protocols, and a set identifying a client device as a standalone device or a clustered device.

6. The method of claim 1, wherein the edges are weighted in relation to each other by type of configuration.

7. A system for test case generation, the system comprising:
   a computer processor;
   a tangible computer-readable storage device coupled to the computer processor; and
   program code stored on the tangible computer-readable storage device that, when executed by the processor, causes the processor to:
      access a problem report data store including a plurality of customer problem reports, wherein the plurality of customer problem reports are collected automatically, and wherein each of the plurality of customer problem reports comprises configuration data and platform data of a system that executes the first version of the software product;
      calculate a number of instances each platform is stored in the problem report data store;
      identify a set of platforms for which the corresponding number of instances satisfies a predefined platform threshold;
      calculate a number of instances each configuration is stored in the problem report data store;
      identify a set of configurations for which the corresponding number of instances satisfies a predefined configuration threshold;
      calculate a number of instances each platform of the set of platforms is associated with each configuration of the set of configurations;
      generate a mapping data structure comprising a plurality of nodes and edges,
         wherein each of the nodes of the mapping data structure identifies one of the set of platforms and the set of configurations,
         wherein the weight of the edge connecting a particular platform to a particular configuration indicates a number of instances that the particular platform is associated with the particular configuration in the problem report data store;
      identify a weighted edge of a weight that satisfies a predefined weight threshold, wherein the weighted edge connects a first platform to a first configuration; and
      in response to identifying the weighted edge of a weight that satisfies the predefined weight threshold, automatically generate a test case for development of a second version of the software product, wherein the test case is configured to test execution of the second version of the software product on the first platform.

8. The system of claim 7, wherein the edges are weighted in relation to each other by associated platform.

9. The system of claim 8, further comprising computer code that causes the processor to, for each identified platform:
   identify weighted edges for each platform greater than the weighted threshold; and generate a platform specific test case to execute on the platform and using the configurations associated with the platform by the identified weighted edges.

10. The system of claim 7, wherein the weight of the edges is modifiable by a user to increase granularity of the edges.

11. The system of claim 7, wherein the set of configurations includes at least one type selected from the group consisting of: a set of databases, a set of application protocols, and a set identifying a client device as a standalone device or a clustered device.

12. The system of claim 7, wherein the edges are weighted in relation to each other by type of configuration.

13. A computer program product for test case generation, the computer program product comprising:
 a non-transitory computer-readable storage device having stored therein computer program code executable by a processor to:
  access a problem report data store including a plurality of customer problem reports, wherein the plurality of customer problem reports are collected automatically, and wherein each of the plurality of customer problem reports comprises configuration data and platform data of a system that executes the first version of the software product;
  calculate a number of instances each platform is stored in the problem report data store;
  identify a set of platforms for which the corresponding number of instances satisfies a predefined platform threshold;
  calculate a number of instances each configuration is stored in the problem report data store;
  identify a set of configurations for which the corresponding number of instances satisfies a predefined configuration threshold;
  calculate a number of instances each platform of the set of platforms is associated with each configuration of the set of configurations;
  generate a mapping data structure comprising a plurality of nodes and edges,
  wherein each of the nodes of the mapping data structure identifies one of the set of platforms and the set of configurations,
  wherein the weight of the edge connecting a particular platform to a particular configuration indicates a number of instances that the particular platform is associated with the particular configuration in the problem report data store;
  identify a weighted edge of a weight that satisfies a predefined weight threshold, wherein the weighted edge connects a first platform to a first configuration; and
  in response to identifying the weighted edge of a weight that satisfies the predefined weight threshold, automatically generate a test case for development of a second version of the software product, wherein the test case is configured to test execution of the second version of the software product on the first platform.

14. The computer program product of claim 13, wherein the edges are weighted in relation to each other by associated platform.

15. The computer program product of claim 14, further comprising computer code executable by a processor to:
 identify weighted edges for each platform greater than the weighted threshold; and
 generate a platform specific test case to execute on the platform and using the configurations associated with the platform by the identified weighted edges.

16. The computer program product of claim 13, wherein the weight of the edges is modifiable by a user to increase granularity of the edges.

17. The computer program product of claim 13, wherein the set of configurations includes at least one type selected from the group consisting of: a set of databases, a set of application protocols, and a set identifying a client device as a standalone device or a clustered device.

18. The computer program product of claim 13, wherein the edges are weighted in relation to each other by type of configuration.

* * * * *